Figure 1:
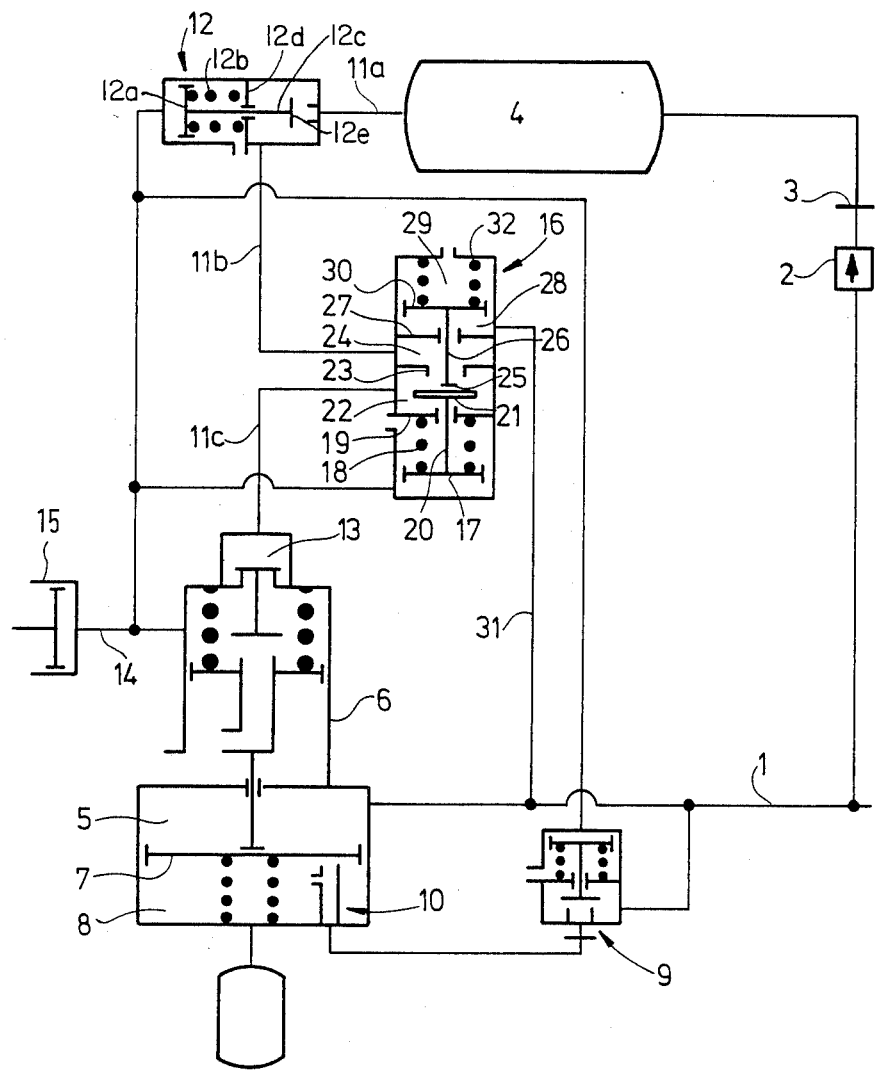

United States Patent [19]

Grünert et al.

[11] Patent Number: 4,575,158
[45] Date of Patent: Mar. 11, 1986

[54] BRAKE CONTROL VALVE DEVICE FOR AN AIR PRESSURE BRAKE SYSTEM OF A RAILWAY VEHICLE

[75] Inventors: Wolfgang Grünert; Johann Huber, both of Munich, Fed. Rep. of Germany

[73] Assignee: Knorr-Bremse GmbH, Munich, Fed. Rep. of Germany

[21] Appl. No.: 636,979

[22] Filed: Aug. 2, 1984

[30] Foreign Application Priority Data

Aug. 2, 1983 [DE] Fed. Rep. of Germany ....... 3327888

[51] Int. Cl.⁴ .............................................. B60T 15/34
[52] U.S. Cl. ......................................... 303/57; 303/36
[58] Field of Search ....................... 303/33, 35, 36, 57, 303/59, 60

[56] References Cited

U.S. PATENT DOCUMENTS 3,554,615 1/1971 Worbois et al. ........................ 303/36

Primary Examiner—Duane A. Reger
Attorney, Agent, or Firm—Edmund M. Jaskiewicz

[57] ABSTRACT

The present invention discloses a maximum pressure control device for the brake cylinder pressure that is to be supplied to a brake cylinder and this device can consist of two separate pressure control devices or be constructed as a unified, reversible pressure control device. The selection of one of the active pressure control devices or changeover of the switchable maximum pressure control device results from a main brake line pressure acting against a spring loaded control piston which, depending on the main brake line pressure, can switch off the pressure control function of the maximum pressure control device for the low (service) or high (emergency) brake cylinder pressure. The control piston when functioning as an actuated cut off device can be mechanically coupled with a pressure control device by means of a stop coupling or pneumatic coupling. As a result, the control piston is not able to exert any negative effect on the control precision of the maximum pressure control device.

6 Claims, 2 Drawing Figures

BRAKE CONTROL VALVE DEVICE FOR AN AIR PRESSURE BRAKE SYSTEM OF A RAILWAY VEHICLE

The present invention relates to a brake control valve device for an air pressure brake system of a railway vehicle having a brake line and a brake cylinder, more particularly, to such a control valve device for limiting the pressure in a brake cylinder to that required for a service brake application and for limiting the pressure to that required for an emergency brake application.

Compressed air brake systems of railway cars have been provided with a maximum pressure control device for limiting the pressure of a brake cylinder to that required for service braking and limiting the pressure in a brake cylinder to that required for emergency braking. Such a pressure control device generally operates by means of valve devices actuated by a piston against a spring force and further having a cut off device which includes a control piston operated against a spring by the main brake line pressure to cut off one of the two controls of the brake cylinder pressure.

Such a brake control valve device is disclosed in U.S. Pat. No. 3,554,615 in which two separate pressure control devices each of which is adjusted to different pressure head demands are connected parallel to one another in a compressed air supply line to the brake cylinder. The pressure control device which is adjusted to the high or emergency brake cylinder pressure has a differential piston one surface of which is actively loaded by the main brake line pressure and the other smaller piston surface is loaded by the down stream pressure of a pressure control device against the force of a spring and in the closing direction of the valve device. This construction has the disadvantage that in an emergency braking situation should the main brake line for any reason not completely empty itself or empty itself very slowly or for any other cause retain a pressure at the differential piston surface loaded by the main brake line pressure, the residual pressure loading this differential piston surface would cause the pressure control device to close prematurely before the high brake cylinder pressure has not yet been reached. This in turn would result in a weak or ineffective braking of the rail vehicles in an emergency situation.

It is therefore the principal object of the present invention to provide a novel and improved brake control valve device for an air pressure brake system of a railway vehicle.

It is another object of the present invention to provide such a brake control valve device which is reliable in operation and unaffected from any possible residual pressure in the main brake line.

It is a further object of the present invention to provide such a brake control valve device which limits the brake cylinder pressure to the service or emergency brake cylinder pressure and enables the maximum possible braking of the car to be achieved during each application of the brakes.

The objects of the present invention are achieved and the disadvantages of the known prior art devices are overcome by providing such a brake control valve device which has a control piston coupled with a piston operated valve device only when the cut off device is actuated. Thus, in the case of an unactuated cut off device and therefore of an operating pressure control device, the control piston will not have any effect on the piston operated control device of the maximum pressure control device which can thus operate properly and correctly without being disturbed by residual pressure in the main brake line.

According to one aspect of the present invention such a brake control valve device or an air pressure brake system of a railway vehicle having a brake line and a brake cylinder may comprise a maximum pressure control device which has a first means for limiting the pressure in a brake cylinder to that required for a service brake application and a second means for limiting the pressure to that required for an emergency brake application. There is a control piston having one side thereof acted upon by the brake line pressure and a second side is acted upon by a spring. A piston actuated valve device means is responsive to a service brake pressure in the brake cylinder to limit the service brake pressure. The control piston is mechanically connected to the valve device when the control piston is actuated such that one of the first or second limiting means is cut off or disengaged so as to be inoperative under those braking conditions.

Figure 2:
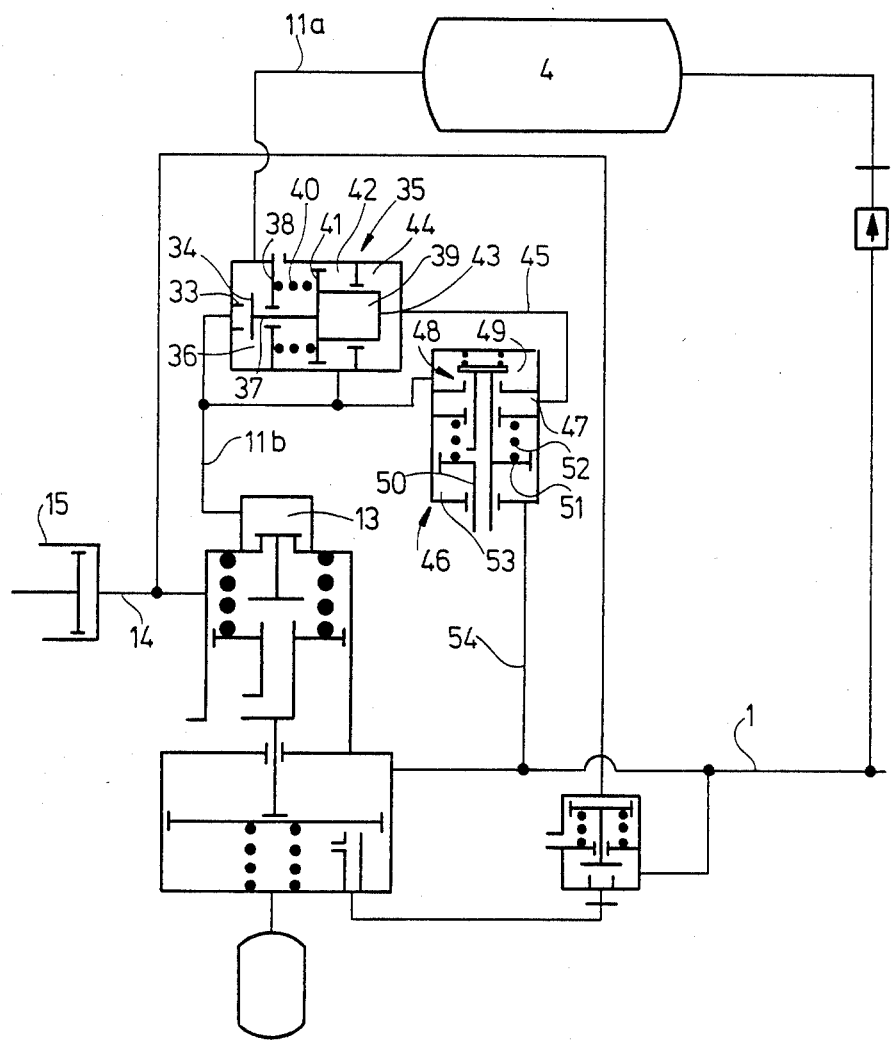

Other objects and advantages of the present invention will be apparent upon reference to the accompanying description when taken in conjunction with the following drawings, which are exemplary, wherein:

FIG. 1 is a diagramatic view of the maximum pressure control device according to the present invention and related elements of an air pressure brake system; and FIG. 2 is a view similar to that of FIG. 1 but showing a modification of the maximum pressure control device.

Proceeding next to the drawings wherein like reference symbols indicate the same parts throughout the various views a specific embodiment and modifications of the present invention will be described in detail. As may be seen in FIG. 1, a main brake line 1 is connected through a check valve 2 and a nozzle 3 comprising a control device to a compressed air reservoir 4. A control chamber 5 of a triple pressure control valve 6 is connected to the main brake line 1. The triple pressure control valve 6 has a control piston 7 which defines on one side thereof a constant pressure chamber 8 which is connected through a monitoring valve 9 and a filling stroke protective device 10 to the main brake line 1. The constant pressure chamber 8 can then be loaded each time from the main brake line 1 through the monitoring valve 9 and protective device 10 in a known manner.

A feed or air supply pipe has a section 11a which connects the air reservoir 4 to a pressure control device 12. Supply pipe section 11b then connects from pressure control device 12 to a second pressure control device 16 which in turn is connected by supply pipe section 11c to the supply chamber 13 of the triple pressure control valve. The supply chamber 13 is positioned immediately ahead of the the valve device of the triple pressure control valve 6. The brake cylinder pressure which can be controlled by the triple pressure control valve 6 is then supplied to a brake cylinder 15 and to pressure control device 12 and to the monitoring valve 9 through brake cylinder pressure line 14. Since the construction of the control valve 12 according to FIG. 1 corresponds to the device disclosed in DE-A No. 1 021 878. This known control valve 12 comprises a piston 12a which is loaded by the pressure in the brake cylinder pressure pipe 14 on one side and on the other side is loaded by a spring 12b and atmospheric pressure. The piston 12a has a stem 12c which slidably and seatingly passes through a wall 12d and has on its end a valve member of a cut-off valve 12e located in a connection of the sections 11a and 11b of the air supply pipe. The cut-off valve 12e closes if piston 12a is loaded by that pressure which is required for an emergency brake application. With the exception that the pressure control device 12 responds to a high brake pressure cylinder which is higher than the closing pressure of the corresponding pressure control device according to DE-A No. 1 021 878 as will be explained in greater detail below, the mode of operation of the control valve according to FIG. 1 corresponds to the operation of this known structure so that it is considered that further explanation with respect to the mode of operation is unnecessary.

The second pressure control device 16 which is connected between sections 11b and 11c of the air supply pipe is thus connected in series with the pressure control device 12 in the supply pipe 11a, 11b, 11c. Similar to the pressure control device 12, pressure control device 16 comprises a piston 17 which is loaded by the pressure in the brake cylinder pressure pipe 14 on one side and the other side is loaded by a spring 18 and atmospheric pressure. The piston 17 has a stem 20 which slideably and sealingly passes through a partition or wall 19 and has on one end thereof a valve member 21 located in a chamber 22 which in turn is connected to section 11c of the air supply pipe. The valve member 21 is engagable with a valve seat 23 integrally formed with the body of the control device 16 so as to form the valve device 21, 23 to monitor the connection of a chamber 24 with chamber 22. The chamber 24 is connected to section 11b of the air supply pipe. Spring 18 thus loads valve 21, 23 in the opening direction by acting upon one face of the piston 17. To this extent, the structure of pressure control device 16 corresponds to that of the pressure control device 12.

Spring 18 and piston 17 are so constructed that the valve 21, 23 will close when the pressure head in brake cylinder pipe 14 is low and corresponds to the maximum allowable pressure load of brake cylinder 15 for a desired service brake application. During this service brake application the pressure in the main brake line 1 is decreased from the normal pressure head to a mean pressure head that is below the normal pressure head by a predeterminded value. The spring and piston of pressure control device 12 are so constructed that the pressure control device 12 closes only when there is a greater pressure head in brake cylinder pressure pipe 14 such as would occur during emergency braking application. During emergency braking, pressure prevailing in the main brake line 1 is decreased between the main pressure head and preferably to atmospheric pressure.

The pressure control device 16 has a valve stem 26 on one end of which is an abutment or stop coupling 25 engagable with the valve 21 on the side thereof directed toward valve seat 23, the stem 26 passes slidingly and sealingly through a partition wall 27 of the body of the control device 16 and has at its other end a control piston 30 that separates chambers 28 and 29 from each other. The chamber 28 located on the rod side of control piston 30 is connected with the main brake line 1 by line 31 and a spring 32 located in the evacuated chamber 29 loads the other side of the control system 30 in the closing direction of the stop coupling 25.

With the brake ready to operate, loaded and in its released position and with the main brake line 1 carrying a normal pressure or pressure head, the normal pressure then existing in chamber 28 will retain the control piston 30 in a position in chamber 29 against the force of spring 32. In this position of control piston 30, the stop coupling 25 is disengaged from the valve member 21 since the end of the stem 26 is spaced at a considerable distance from the valve member 21 as may be seen in FIG. 1. The valve members of both pressure control devices 12 and 16 which together constitute a maximum pressure control device are open when there is no pressure in the brake cylinder supply line 14.

During a service brake application, the pressure in main brake line 1 will be lowered from its normal pressure to that mean pressure which is required for the service braking application. The decrease of the pressure in the main brake line 1 results in a pressure difference acting on control piston 7. The control piston 7 rises and actuates valve means of the control valve 6 which feed air from the supply chamber 13 to the brake cylinder pressure line 14 and the brake cylinder 15 up to a pressure corresponding to the decrease of the pressure in the main brake line 1. When the service braking state is reached, the brake cylinder pressure acting upon piston 17 will be sufficient to lift piston 17 against the force of spring 18 and to close valve 21, 23 by positioning valve 21 on valve seat 23. The control piston 30 remains idle during these processes and the stop coupling 25 therefore remains open. When the valve 21, 23 is closed, the controllable pressure in the brake cylinder 15 is now limited to the low pressure head or pressure required at that service braking application.

However, if the pressure in the main brake line 1 is lowered below the mean pressure head and preferably to atmospheric pressure as is usually the case for an emergency braking application, spring 32 will press control piston 30 downwardly against the pressure in chamber 28 which by this time is almost without any pressure. Stop coupling 25 will close into engagement with valve member 21 to open the valve 21, 23. Beginning from the service braking condition as described above, compressed air will continue to flow into brake cylinder 15 from air reservoir 4 through triple pressure control valve 6 so that a high brake pressure is built up in the brake cylinder 15. However, this high brake pressure is not sufficient to close piston 17 and valve 21, 23 against the force of spring 32. However, when a specific high brake pressure cylinder is attained, the pressure control device 12 will be closed and will cut off any further supply of compressed air to brake cylinder 15 so that the load is thus limited to this high brake pressure.

Upon release of the brake, the reverse of the above described processes correspondingly occur. It is essential that at no time and under no braking conditions should any pressure head prevailing at that time in the main brake line 1 be able to influence in any way the closing action of pressure control devices 12 and 16 in such a manner that there would be any deviations of pressure from the values prescribed for the brake cylinder pressures. Control piston 30 with spring 32 and stop coupling 25 thus function as a cut off device which either leaves pressure control device 16 fully able to function or, in the case of an emergency braking, cuts off control device 16 completely in its open condition.

The two pressure control devices 12 and 16 as described above in FIG. 1 can be connected parallel to one another in the supply pipe 11a, 11b and 11c in a manner generally corresponding to the above mentioned U.S. Pat. No. 3,554,615. In this modification, the pressure control device 12 which is adjusted to the high or emergency brake cylinder pressure is coupled by a stop coupling with the control piston which on one side is loaded by a spring and on the other side by the pressure in main brake line 1. The pressure control device is thus kept closed while the pressure in the main brake line 1 against the force of the spring and by the stop coupling during any reduction in pressure in the main brake line which may be reduced by service braking applications. However, the other pressure control device which is adjusted to the low or service brake cylinder pressure requires no control piston which is loaded on one side by main brake line 1 and on the other side by a spring thus operates in the usual known manner whereby the brake cylinder pressure is limited to the low maximum allowable pressure head in the case of a complete service braking application. During an emergency braking, the pressure in main brake line 1 is reduced to such an extent that the spring is able to move the control piston against the main brake line pressure and thus open the stop coupling a result of which the emergency pressure control device is placed into operation from its previously closed cut off position and opens. The pressure control device will remain open until a high maximum brake cylinder pressure corresponding to an emergency braking pressure is attained and only then does the pressure control device close to limit this pressure in the usual manner.

The structures of the pressure control devices themselves are not limited to the relatively simple construction illustrated in FIG. 1. In order to improve their control characteristics, the pressure control devices can have other known structures.

In a further modification of FIG. 1, one or both of the pressure control devices can be connected in the supply lines 11a, 11b, 11c or one or both of the pressure control devices can be connected directly in the brake cylinder pressure line 14 between the triple pressure control valve 6 and brake cylinder 15 and be controlled in each case by the pressure prevailing downstream from the pressure control devices. In addition, these modifications are also possible in the above described parallel connection of both pressure control devices.

In FIG. 2, the two pressure control devices are combined into a structural unit. In FIG. 2, a pressure control device 35 has a valve seat 33 integral with the body of the pressure device and a moveable valve 34 which combined to make up valve 33, 34 which is connected between a feed pipe section 11a leading from reservoir 4 to the supply chamber 13 in the triple pressure control valve. The inner space of valve seat 33 is connected with feed pipe section 11b and a chamber 36 in which is located the valve 34 is connected with feed pipe section 11a. The valve member 34 is mounted on one end of a rod or valve stem 37 which slidingly and sealingly passes through an opening in a partition wall 38. The other end of valve stem 37 is attached to a differential piston 39 having a large differential surface directed toward valve member 34 and this surface is also loaded by spring 40 and atmospheric pressure. In the closing direction of valve 33, 34 the differential piston 39 has an annular surface 41 which defines a chamber 42 which is permanently connected to feed pipe section 11b and through this feed pipe section to supply chamber 13 of the triple pressure control valve. Differential piston 39 has a small differential surface 43 which defines a portion of the chamber 44 which is connected through pipe line 45 to a changeover valve 46. Pipe 45 is connected to a chamber 47 in the changeover valve 46 which can be connected by a two-way valve 48 either with a chamber 49 or by a tubular valve stem 50 with the atmosphere. Chamber 49 is permanently connected to feed line section 11b. The tubular valve stem 50 has mounted thereon a control piston 51 which, in the direction for switching two-way valve 48 for evacuation of chamber 47, is loaded by atmospheric pressure and a spring 52, and its other side, is loaded by the pressure in a chamber 53 which is permanently connected to the main brake line 1 by a pipe line 54. Otherwise, the pressure control valve of FIG. 2 corresponds in construction to the pressure control valve in FIG. 1 bearing in mind, however, that control devices 12 and 16 and section 11c of the feed line are omitted. The valve 33,34 can be spanned by a non-return or check valve (not shown) in the backflow direction.

The total surface area of the annular surface 41 and piston surface 43 and the force of spring 40 are so selected that the valve 33, 34 closes when the brake cylinder pressure in chambers 42 and 44, which to be limited, and at a maximum corresponds to that of service braking is reached. In these conditions, the annular surface 41 is so dimensioned that it causes the closing of valve 33,34 in cooperation with spring 40 in the case of the exclusive load in chamber 42 with the brake cylinder pressure and the evacuated space 44 when the high brake pressure corresponding to an emergency braking in chamber 42 is reached.

Piston 51 and spring 52 of the changeover valve 46 are so selected that when a pressure head in chamber 53 which at least attains the mean pressure head in main brake line 1 to cause a service braking, the piston 51 is lifted against the force of spring 52 such that changeover valve 46 is in a switching position connecting the two chambers 47 and 49 with each other. Chamber 44 is therefore loaded by the pressure prevailing in section 11b of the feed pipe which is to be limited by the pressure control device 35. Pressure control device 35 thus limits the pressure prevailing in feedpipe section 11b to the low pressure head of service braking. This function is maintained as long as a pressure head which at a maximum corresponds to a service braking application, exists in the main brake line 1.

If the pressure in main brake line 1 is reduced below this mean value so as to attain an emergency braking, the spring 52 will move piston 51 downwardly against the pressure in chamber 53 that has been reduced together with the main brake line pressure. Accordingly, the two-way valve 48 reverses and now separates chambers 47 and 49 from one another and chamber 47 is evacuated through the hollow valve stem 50 together with chamber 44 through pipe 45 into the atmosphere. The pressure control device 35 therefore closes valve 33, 34 only when a high brake cylinder pressure as is necessary for emergency braking is attained in feedpipe section 11b. Remaining function of the pressure control valve according to FIG. 2 is similar to the corresponding component in FIG. 1 and need not be further described.

In the modification of FIG. 2, it is possible to connect chambers 42 and 44 directly or through the changeover valve 46 to the brake cylinder pressure line 14 instead of to feedpipe section 11b as shown. Also, the valve 33,34 can be connected in series to brake cylinder 15 directly or by a usual optionally load-controllable separate relay valve instead of being incorporated between feedpipe sections 11a and 11b. In addition, the structure of control device 35 can be further modified such that the annular surface 41 and piston surface 43 can be made to work against one another so that with a load on both piston surfaces the pressure control device closes when a high or emergency brake cylinder pressure is attained. But when there is a load only on one of these piston areas the pressure control device will close only when a low or service brake cylinder pressure exists. In this later situation however the changeover valve 46 is constructed to have a switching function which is reversed of that shown in FIG. 2.

It is also essential that in the modification of FIG. 2, the main brake pipe pressure is able to adjust pressure control device 35 only to the pressure limit in the case of either low or high brake cylinder pressure but not affect the other functions of the pressure control device. This adjusting of the pressure control device 35 is preferably accomplished by a pneumatic coupling.

The foregoing is based on the assumption that according to the structures of FIG. 1 and FIG. 2, with the exception of the main brake line 1, the air reservoir 4 and brake cylinder 15 are combined in the usual way for a pressure control device. However, this system can be constructed with individual valves and the pressure control valve can be arranged in an independant structure. The pressure control valve can also be provided with other known devices such as, for example, a relay valve, optionally load dependent, to be connected in series with brake cylinder 15, a passenger-freight changeover apparatus or the like.

Thus it can be seen, that the present invention as disclosed a maximum pressure control device for the brake cylinder pressure that is to be supplied to a brake cylinder and this device can consist of two separate pressure control devices or be constructed as a unified, reversible pressure control device. The selection of the active pressure control device 12 or 16 respectively or changeover of the switchable maximum pressure control device results from a main brake line pressure acting against a spring loaded control piston 30 which, depending on the main brake line pressure, can switch off the pressure control function of the maximum pressure control device for the low (service) or high (emergency) brake cylinder pressure. The control piston when functioning as an actuated cut off device can be mechanically coupled with a pressure control device by means of a stop coupling or pneumatic coupling. As a result, the control piston is not able to exert any negative effect on the control precision of the maximum pressure control device.

It will be understood that this invention is susceptible to modification in order to adapt it to different usages and conditions, and, accordingly, it is desired to comprehend such modifications within this invention as may fall within the scope of the appended claims.

What is claimed is:

1. In a brake control valve device for an air pressure brake system of a railway vehicle having a brake line and a brake cylinder, a maximum pressure control device having a first means for limiting the pressure in a brake cylinder to that required for a service brake application and a second means for limiting the pressure to that required for an emergency brake application, said maximum pressure control device comprising a control piston having one side thereof acted upon by the brake line pressure and a second side acted upon by a spring, a piston actuated valve device means responsive to a service brake pressure in the brake cylinder for limiting the service brake pressure, and means for mechanically connecting said control piston and said valve device when said control piston is actuated such that one of said first and second limiting means is cut off.

2. In a brake control valve device as claimed in claim 1 wherein said mechanical connecting means comprises an abutment coupling extending from said control piston and engagable with said valve device means to cut off said service brake pressure limiting means.

3. In a brake control valve device as claimed in claim 2 wherein said first and second pressure limiting means comprises two separate pressure control devices connected in series with the brake cylinder, said abutment coupling in its engaged position holding open the pressure control device for the service pressure.

4. In a brake control valve device as claimed in claim 2 wherein said first and second pressure limiting means comprises two separate pressure control devices connected in series with each other and in parallel to the brake cylinder, said abutment coupling in its engaged position holding closed the pressure control device for the emergency pressure.

5. In a brake control valve device for an air pressure brake system of a railway vehicle having a brake line and a brake cylinder, a maximum pressure control device having a first means for limiting the pressure in the brake cylinder to that required for a service brake application and a second means for limiting the pressure to that required for an emergency brake application, said maximum pressure control device comprising a first valve, a differential piston operatively connected to said first valve and having first and second differential piston surfaces, means for permanently loading one of said differential piston surfaces, a changeover valve connected to the other of said differential piston surfaces to variably load the same, said changeover valve having a control piston having one side connected to the atmosphere and the other side connected to the brake line down stream of said pressure control device.

6. In a brake control valve device as claimed in claim 5 wherein said differential piston surfaces operate in a direction to close said first valve, said control piston switching said changeover valve to the pressure cut off of said second differential piston's surface in response to a greater load in the main brake line.

* * * * *